US00RE38378E

(19) United States
(12) Reissued Patent
Montague

(10) Patent Number: US RE38,378 E
(45) Date of Reissued Patent: Jan. 6, 2004

(54) VEHICLE/AIRCRAFT SECURITY SYSTEM BASED ON VEHICLE DISPLACEMENT PROFILE, WITH OPTIONAL GPS/ CELLULAR DISCRIMINATION INDICATOR

(75) Inventor: Albert Montague, Deal, NJ (US)

(73) Assignee: Sivan LLC, Deal, NJ (US)

(21) Appl. No.: 09/916,938

(22) Filed: Jul. 27, 2001

Related U.S. Patent Documents

Reissue of:
(64) Patent No.: 5,929,753
Issued: Jul. 27, 1999
Appl. No.: 09/034,925
Filed: Mar. 5, 1998

U.S. Applications:

(63) Continuation-in-part of application No. 08/812,316, filed on Mar. 5, 1997, now abandoned.

(51) Int. Cl.[7] ..... B60R 25/10
(52) U.S. Cl. ..... 340/426; 340/425.5; 307/10.2
(58) Field of Search ..... 340/426, 425.5, 340/429, 566, 438; 307/9.1, 10.1, 10.2

(56) References Cited

U.S. PATENT DOCUMENTS

| | | | | |
|---|---|---|---|---|
| 4,651,128 A | | 3/1987 | Kolb | 340/440 |
| 4,684,928 A | * | 8/1987 | Takahashi et al. | 340/521 |
| 4,929,925 A | * | 5/1990 | Bodine et al. | 340/426 |
| 5,155,467 A | * | 10/1992 | Matsubara | 340/429 |
| 5,416,464 A | * | 5/1995 | Rimback et al. | 340/426 |
| 5,418,537 A | * | 5/1995 | Bird | 342/357 |
| 5,424,711 A | * | 6/1995 | Muller et al. | 340/426 |
| 5,457,438 A | * | 10/1995 | Ziegler | 340/426 |
| 5,497,149 A | * | 3/1996 | Fast | 340/988 |
| 5,513,244 A | * | 4/1996 | Joao et al. | 340/425.5 |
| 5,515,043 A | * | 5/1996 | Berard et al. | 340/988 |
| 6,166,656 A | | 12/2000 | Okada et al. | 340/901 |
| 6,404,073 B1 | * | 6/2002 | Chiang | 340/426 |

* cited by examiner

*Primary Examiner*—Toan Pham
(74) *Attorney, Agent, or Firm*—Ezra Sutton

(57) ABSTRACT

A real-time (instantaneous) vehicle anti-theft warning, notification and tracking system is disclosed that eliminates false alarms by comparing a calculated displacement profile representing the characteristics of a measured displacement (or apparent displacement) of a vehicle with predetermined displacement profiles. The present invention employs a displacement sensor with a unique monitoring program that measures the rate-of-change, direction, and/or duration of displacement of a vehicle (e.g., an automobile or aircraft) over time, and accurately characterizes real and virtual displacements based on the comparison of the calculated displacement profile with the predetermined displacement profiles. The invention also may include GPS/cellular indication capability to alert the vehicle owner of a theft event, and may also include a discrimination indicator to alert the vehicle owner that GPS/cellular capability is not available.

28 Claims, 4 Drawing Sheets

VEHICLE/AIRCRAFT SECURITY SYSTEM BASED ON VEHICLE DISPLACEMENT PROFILE, WITH OPTIONAL GPS/ CELLULAR DISCRIMINATION INDICATOR

Matter enclosed in heavy brackets [ ] appears in the original patent but forms no part of this reissue specification; matter printed in italics indicates the additions made by reissue.

This is a continuation-in-part of application Ser. No. 08/812,316, filed Mar. 5, 1997, now abandoned, the specification of which is incorporated herein by reference.

BACKGROUND OF THE INVENTION

1. Field of the Invention

The present invention relates to a real-time (instantaneous) vehicle anti-theft warning, notification and tracking system that eliminates false alarms by comparing a calculated displacement profile representative of the characteristics of a measured displacement (or apparent displacement) of a vehicle with predetermined displacement profiles. The present invention employs a displacement sensor with a unique monitoring program that measures the rate-of-change, direction, and/or duration of displacement of a vehicle (e.g., an automobile or aircraft) over time, and accurately characterizes real and virtual displacements based on the comparison of the calculated displacement profile with the predetermined displacement profiles.

2. State of the Art

Private/commercial vehicles and items in vehicles continue to be stolen despite the prevalence of factory equipped or after-market warning systems. Current security systems fail to protect vehicles from being stolen and/or violated by thieves because the systems have certain limitations. Most alarm systems are fundamentally passive, i.e., they generate an alarm signal (e.g., a siren) in the vicinity of the vehicle only. As such, an owner or law enforcement agency cannot respond in a timely manner to an imminent theft or a theft in progress. Quick response is vital to preventing such thefts, particularly in view of the use of tow trucks and lift trucks in vehicle thefts.

Vehicles equipped with motion sensors are prone to generating false alarms because they cannot with certainty differentiate between the movement of a vehicle caused by a non-theft event (e.g., a seismic event, movement due to melting ice or snow, someone sitting on the vehicle) and an actual theft in progress (e.g., the lifting of the vehicle to tow it away or an unauthorized entry of the vehicle). These false alarms have diminished the significance of any vehicle alarm sounding or communicating with an owner or law enforcement agency; bona fide vehicle alarm activations are often ignored by the police, and the public. Quoting an authority in security systems, Mr. David Bell, from the November 1996 issue of Security Products, a monthly trade publication: "Alarms have a difficult reputation. They've been fitted in the after-market for a while, and the poor security and poor reliability of many products have given them a bad name. Obviously, false alarms are the worst problem—people have gotten so used to them that they pay no attention when a car alarm is sounding." These simple and costly facts are clearly indicative that current alarm systems need to be improved. Security systems that can track vehicles by remote means and/or immobilize them by shutting off critical subsystems, e.g., ignition systems, are largely ineffective because of their passive (delayed) operating characteristic. Responding in seconds to a bona fide theft is vital in successfully thwarting the efforts of a thief. But, more often than not, hours pass before the owner of a vehicle becomes cognizant that his/her vehicle has been stolen or violated, and only then are the police notified to institute various countermeasures. These delayed countermeasures are futile in saving the vehicle or vehicle contents from theft, since too much time elapses between the theft and the notification of the police. The vehicle, for example, may already have been dismantled, or placed in the hold of a ship for shipping to a location for resale. Time, which is absolutely critical in this situation, is lost before the police are notified of the stolen vehicle, either by the owner or by a private servicing security entity. The vehicle is simply lifted up by a two truck in a matter of seconds and transported away; then, while en route or at a remote location, the vehicle's power supply is disconnected, including the back-up (hidden) power supply used for the security system. A thief requires very little time to secure the vehicle, transport it away, and inactivate the receiving and transmitting electronic systems that either track or immobilize the vehicle.

Proactive alarm systems have been developed that can, for example, communicate with the vehicle owner and/or law enforcement agencies via wireless notification methods (e.g., pagers, cellular telephones, etc.). These systems rely on conventional detection techniques to sense the occurrence of a possible theft event. In light of the serious technological shortcomings with conventional detection techniques outlined above, these security systems cannot be relied upon to communicate accurately, immediately and directly with the police; too many false alarms are generated.

U.S. Pat. No. 4,929,925 to Bodine et al. ("Bodine"), the disclosure of which is incorporated herein by reference, discloses an alarm system that monitors several regions in and around a vehicle utilizing ultrasound. The system of Bodine is based on measuring the distance between a sensor and a fixed location, for example, the ground beneath the vehicle, and triggering an alarm if a subsequent measurement of the same distance indicates movement of the vehicle such that the distance between the sensor and the fixed point has changed beyond a threshold amount. Specifically, a hood transducer first measures the distance between the hood transducer and the ground when the vehicle is initially parked (the "initial value") and the measurements are periodically taken to measure the same distance at a later time (the "current value"). If the current value is greater than the initial value, that is an indication that either the automobile or the hood of the automobile has been lifted, and an alarm is activated. Thus, the system of Bodine cannot discriminate between an actual theft event (the lifting of the car for towing) and a non-theft event (a seismic tremor or vibration caused by a truck passing near the vehicle). Further, since Bodine only detects an increase in distance between the sensor and the ground, downward movement of the vehicle (for example, when someone sits in the vehicle) is not detected by the hood transducer.

SUMMARY AND OBJECTS OF THE INVENTION

The present invention overcomes the limitations of the prior art systems by measuring the rate-of-change and the duration of the displacement of a vehicle over time, and comparing the duration of the displacement and the rate-of-change over time to predetermined displacement profiles or "signatures" that are correlated to both non-theft events that are likely to occur and to actual theft events. When the characteristics of the displacement of the vehicle matches the displacement profile of an actual theft event, alarms can be triggered and/or electronic notification of the vehicle owner and/or law enforcement officials can be instituted. The ability to discriminate between actual theft events and non-theft events utilizing a displacement profile rather than the size of the displacement results in a more accurate system that generates fewer, if any, false alarms.

According to one feature of the invention, the present invention employs a displacement sensor and a system that analyzes the rate-of-change, duration, and direction of a displacement over a predetermined time period.

According to another feature of the invention, the present invention combines a displacement sensor system that analyzes the rate-of-change, duration, and direction of a displacement over time, with other conventional environmental detectors and sensors (e.g., a mass sensor). The displacement sensor system and the other detector/sensors are electrically interlocked to eliminate the possibility of false alarms through the use of a sequential, programmed set of checks and balances.

Another object of the invention is to provide a system that follows a methodical procedure to eliminate false alarms by discriminating between casual or environmental disturbances (the loud noise or vibrations from a passing truck; displacements caused by an earthquake or an individual leaning on the car or striking a window with a fist or object; apparent displacement associated with the effects of melting of falling ice or snow) and the action of a thief.

Another object of the invention is to provide a real-time system that measures the rate-of-change, duration and direction of a vehicle's displacement by continuously bouncing sound waves from the underside of the vehicle to the ground and back, and analyzing the sound waves. When a genuine threatening situation is observed by comparing the analyzed sound waves to the displacement profile, notification and tracking systems can be activated immediately.

Another object of the invention is to provide a real-time vehicle anti-theft notification and tracking system that employs a displacement sensor and system that analyzes the rate-of-change and duration of a displacement over a predetermined time period and utilizes conventional environmental sensors, e.g. door switches, audio sensor, mass sensor, etc., as well as tele-communications and global positioning capability to immediately notify the owner, police, or authorized law enforcement agency through a pre-recorded message that conveys the nature of the emergency, the make, color, model and license number of the vehicle that is in the process of being stolen and its location, using a wireless record/playback telecommunications system. Verbal location notification and vehicle characterization is required only if automatic location systems (for example, WTCS or GPS) cannot obtain an accurate fix on the location of the vehicle when the alarm was activated.

Another object of the invention is to provide an apparatus that immediately apprises the vehicle operator that the automatic location system, (e.g., GPS or WTCS) is non-functional and therefore cannot obtain an accurate fix on the vehicle parked location. This allows the vehicle operator to take actions, such as the recording of a verbal message indicating the exact location of the vehicle, to ensure that other notification means can be instituted. This problem with the location system is automatically and clearly displayed in the cab of the vehicle. The present system has the operational latitude to selectively notify the owner and/or the police, separately or simultaneously, of an on-going theft.

DETAILED DESCRIPTION OF THE PREFERRED EMBODIMENTS

Figure 1:
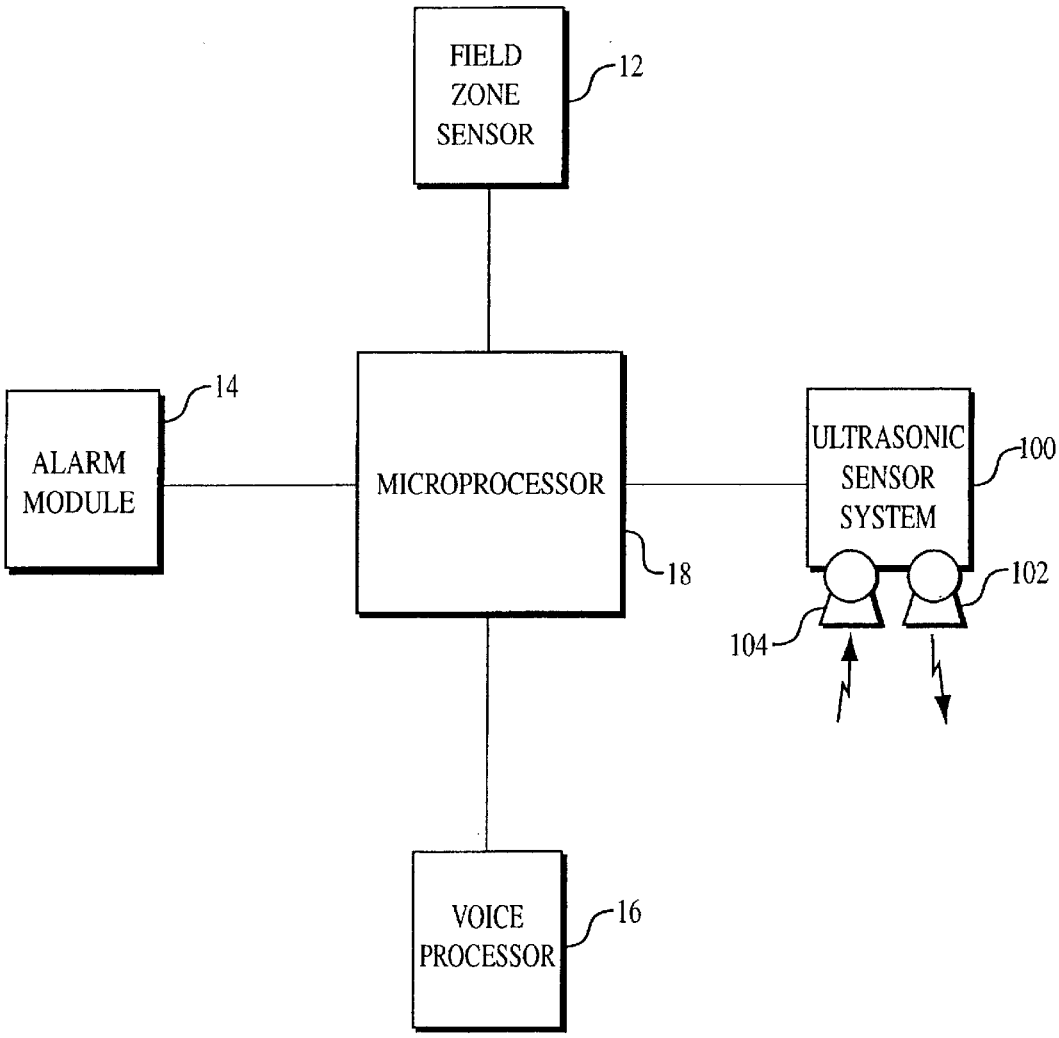
FIG. 1 is a block diagram of electronic circuitry of the alarm system of the present invention.

FIG. 1 is a schematic block diagram of a first embodiment of the present invention. The warning system includes an ultrasonic sensor system 100, field zone sensor 12, an alarm module 14, a voice processor 16, and a microprocessor 18.

The field zone sensor 12 is a conventional device currently used in automobile alarm systems which uses electronic means to detect the presence of potential thieves both inside and outside the vehicle. One example of an acceptable field zone mass sensor 12 is the Alpine Corp. radar sensor model SEC 8345.

Alarm module 14 represents any conventional device used in automobile alarm systems to sound an alarm and/or notify the vehicle owner and/or others (e.g., police) that a theft event is occurring, or which transmits the vehicle location to others. Such devices can include sirens, flashing lights, wireless communication systems (e.g., pagers), location systems that transmit position information (e.g. GPS systems) and the like, or any combination thereof.

Additional detection devices can be included, such as an audio sensor to detect the shattering of glass. One example of an acceptable audio sensor is DEI Corp. audio sensor model 506T. The audio sensor is not an essential feature of the present invention, however, it improves the characterization of a potential theft or violation of a vehicle.

In the present preferred embodiment the field zone sensor 12 is affixed to the vehicle in accordance with conventional practice, which will not be discussed in detail herein. The field zone sensor 12 is electrically wired and operates as it does in conventional practice, with the exception of the treatment or use of the output signals, as will be discussed in detail hereinafter.

A conventional alarm system (not shown) may also be affixed to the vehicle in accordance with conventional practice, and is not discussed in detail herein. If used, the conventional alarm system is electrically wired and operates as it does in conventional practice, with the exception of the treatment or use of the output signals, as will be discussed hereinafter. Generally speaking, conventional alarm systems comprise microprocessor control units, sirens, cut-off switches, pagers, etc., and the alarm receives input from a conventional sensor system which can include door switch sensors, trunk switch sensors, audio sensors, mass sensors, and shock sensors.

Ultrasonic sensor system 100 measures the distance between a transmitter/sensor and an object and stores distance and timing information based on the measurements. It is understood that ultrasonic sensor system 100 can be replaced with any system that can measure a distance between two points (for example, an accelerometer) and which can provide data regarding the distance measured for storage and analysis.

The ultrasonic sensor system 100 includes an ultrasonic transmitter 102 and an ultrasonic receiver 104. Ultrasonic sensor system 100 also includes conventional amplification's circuitry (not shown) to amplify the received signal from receiver 104. Transmitter 102 transmits an ultrasonic signal in a specified direction, and receiver 104 receives the signal reflected off of objects or surfaces that are in the path of the transmitted signal. Microprocessor 18 is connected to transmitter 102 and receiver 104 and includes memory capability to allow storage of data regarding the time required for the sonic waves to travel to the object and return back to the sensor, and is programmable to calculate, among other things, the distance between the ultrasonic sensor system and the object and the velocity of any displacement of the sensor (and thus the vehicle to which it is attached), based on the data received from ultrasonic sensor system 100. By way of example only, microprocessor 18 can comprise a PICSTIC PIC16C84 microcontroller manufactured by Micromint.

Microprocessor 18 is programmed to calculate a "displacement profile" of an actual or virtual displacement and compare the displacement profile with predetermined displacement profiles. As used herein, the term "displacement profile" means a plurality of characteristics of a displacement (e.g., change over time) which, in combination, provide detailed information about the nature of the displacement. For example, in the present invention, the displacement profile can include information regarding the velocity of a displacement, the direction of the displacement, and/or the duration of the displacement. These characteristics, in combination, can be compared with predetermined displacement profiles which are characteristic of a particular event, e.g, the lifting of the vehicle onto a tow truck or the displacement of the vehicle due to a seismic event. As is described below, the simple determination that a vehicle has moved up or down from point A to point B is not enough to justify the triggering of an alarm, as too often false alarms will be generated. It is the calculation of the displacement profile, and the comparison of the calculated displacement profile with predetermined profiles that increases the "accuracy" of the alarm of the present invention.

Figure 2:
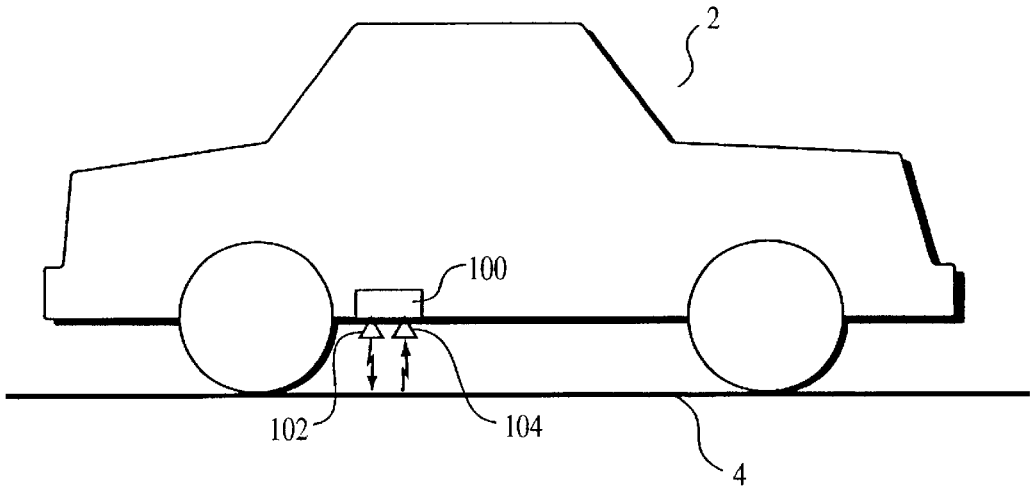
FIG. 2 is an outline of a typical automobile showing a typical positioning of an ultrasonic sensor system of the present invention.

The ultrasonic sensor system 100 initially measures the distance from the transmitter 102 to the surface of the roadway or tarmac. Referring to FIG. 2, the ultrasonic sensor system 100 is installed on the vehicle 2 at a location that provides line of sight with the roadway or tarmac 4 and is optimally located somewhere between the front and rear wheels. The initial distance measured by the ultrasonic sensor system 100 is utilized as a reference point to detect and analyze the rate-of-change of displacement over time, and the direction of displacement of the vehicle, once the vehicle is parked and the security system activated. The ultrasonic sensor system 100 can be mounted on the lower part of the vehicle, e.g., under a seat, inside the front console, under the fuselage of an aircraft, etc., and positioned so that it directs, unimpeded by structure, ultrasonic waves to the roadway or tarmac beneath the vehicle. For the highest degree of resolution, the ultrasonic sensor system 100 should be activated continuously, i.e., the instant the warning system is armed.

In operation, the ultrasonic sensor system 100 is reset by the driver each time the vehicle is parked. Resetting the entire alarm system automatically causes the ultrasonic sensor system 100 to reset to a new reference point; a new measurement is made from the transmitter 102 to the surface below the vehicle, and the microprocessor 18 determines and stores the new reference distance.

Figure 3:
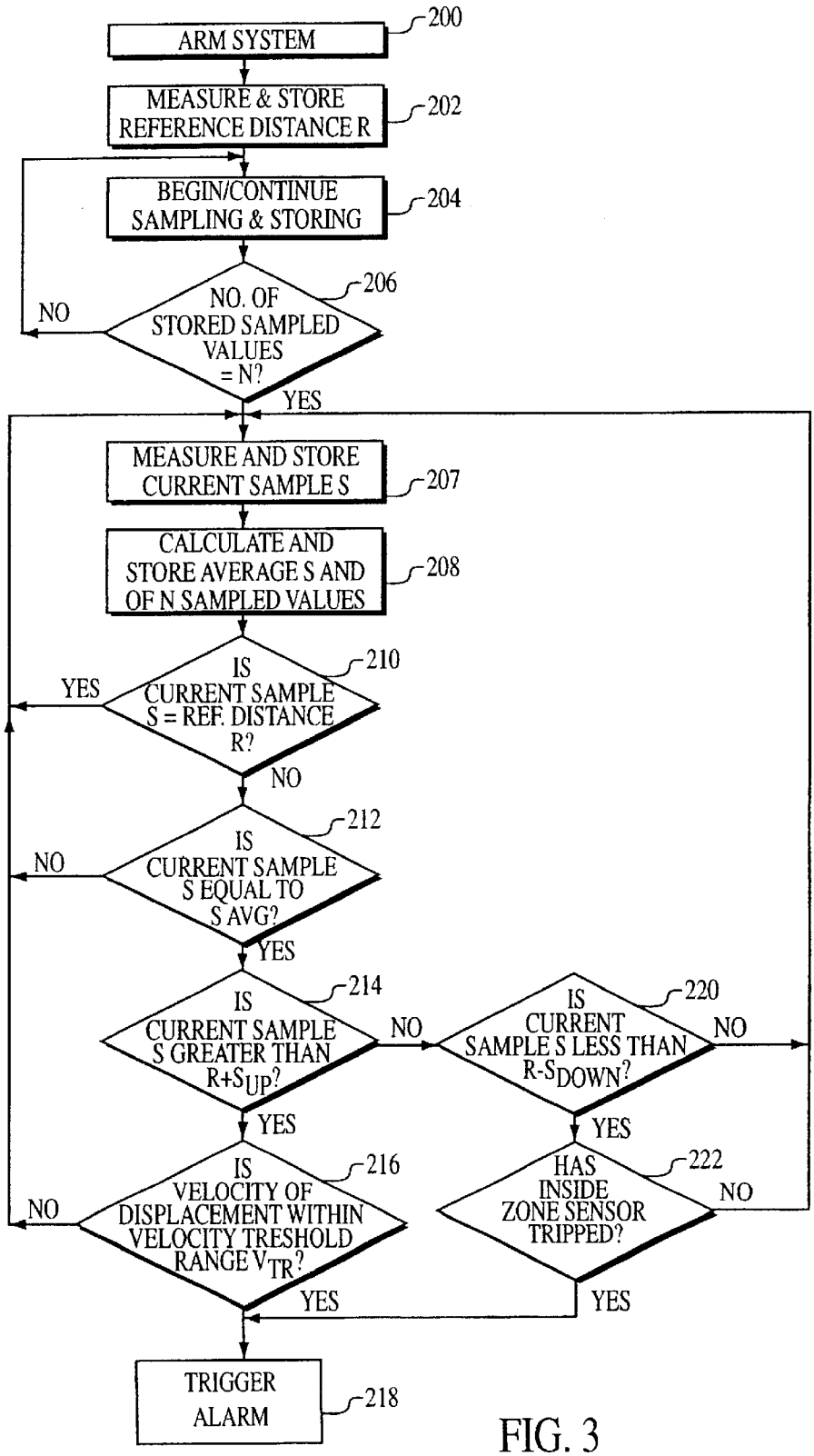
FIG. 3 is a flow chart illustrating the operation of a microprocessor within the circuit block of FIG. 1.
Figure 4:
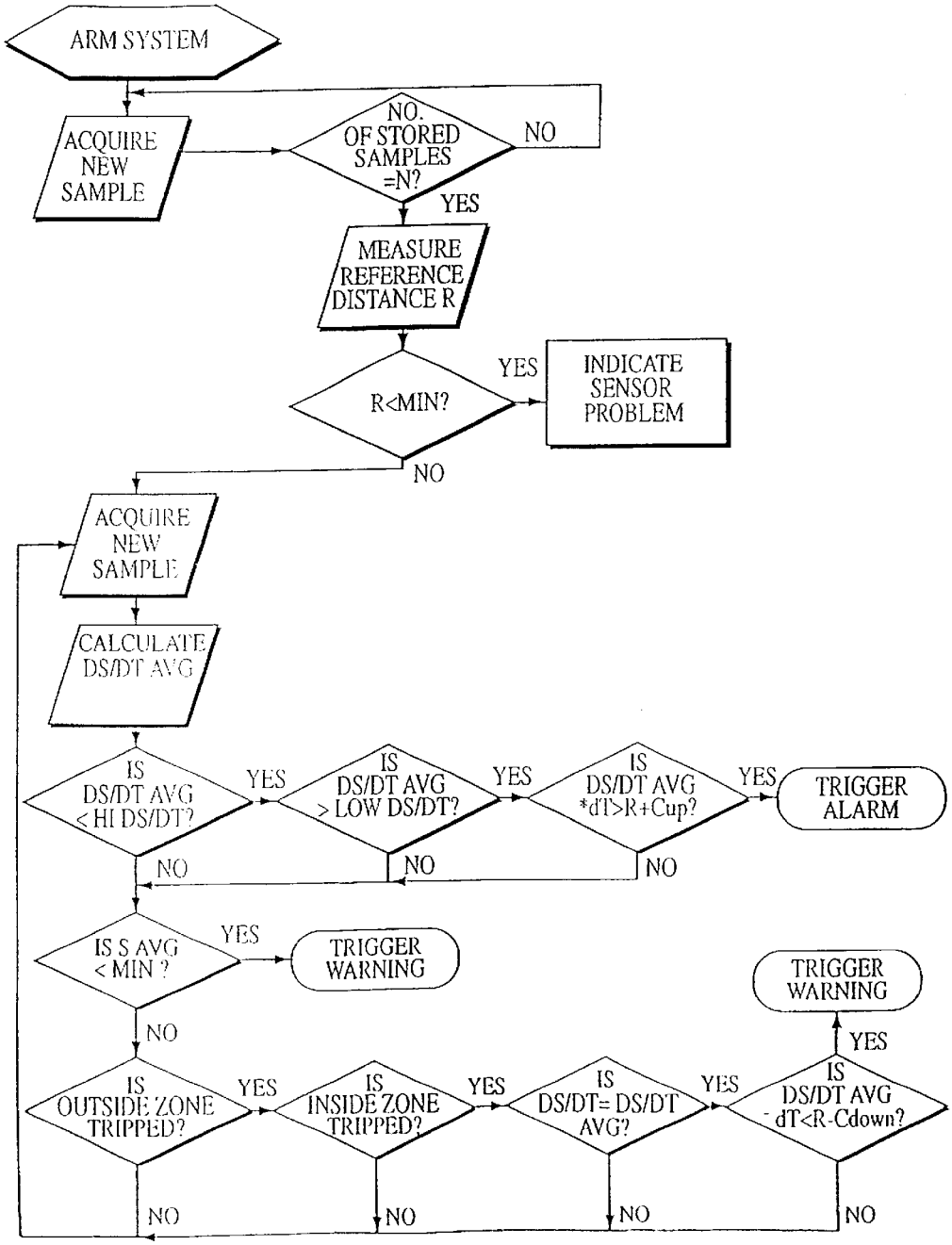
FIG. 4 is a flow chart illustrating this embodiment in which the system determines if the velocity of displacement is positive and within the velocity threshold range.

FIG. 3 is a flow chart illustrating the operation of microprocessor 18. Writing of a specific code to perform the steps illustrated in FIG. 3 can be easily accomplished by one of ordinary skill in the programming arts; thus, specific coding instructions are not supplied herein.

Referring to FIG. 3, at step 200, the system is armed by the vehicle owner. This can be accomplished automatically by, for example, arming the system whenever the ignition is turned off. Alternatively, the user can actively perform an action such as pressing a button to arm the system. When the system is armed, the transmitter 102 sends a signal which bounces off the roadway or tarmac surface and is received by receiver 104 (step 202). Microprocessor 18 calculates the reference distance R based upon the time it takes the signal to travel from transmitter 102 and back to receiver 104. The reference distance R is used with other information described below to calculate the displacement profile.

At step 204, the sampling process begins. The microprocessor 18 controls the transmitter 102 so that it continuously sends, in short, high speed intervals (for example, 10 times per second) ultrasonic signals which bounce off the road or tarmac surface and are received by receiver 104. Microprocessor 18 stores data regarding the sample as it is received at receiver 104. At step 206, the microprocessor 18 determines if N sampled distance values have been stored in the microprocessor. The value of N helps determine the duration of a displacement. For example, if transmitter 102 is sending out signals 10 times a second, after three seconds have elapsed, thirty sampled distance values (N=30) will be stored in microprocessor 18. The significance of the storage of three seconds of distance data will be discussed more fully below.

If the microprocessor 18 determines at step 206 that N sampled distance values have not yet been stored in the microprocessor 18, sampled distance values are stored until N sampled distance value have been stored. When N has been reached, at step 207 microprocessor measures and stores the "current sample" S, and at step 208 microprocessor 18 calculates and stores the average distance SAVG between the sensor and the ground based on N sampled distance values.

At step 210, microprocessor 18 determines if the current sample distance S is equal to the reference distance R. If the current sample distance S is equal to the reference distance R, this confirms that no displacement has taken place and microprocessor 18 continues sampling and storing. With each iteration, the oldest sample distance is replaced with the newest or current sample distance S.

If microprocessor 18 determines that the current sample distance S does not equal the referenced distance R, this indicates that a displacement has occurred. At step 212, microprocessor 18 determines if the current sample distance S is equal to the average sample value $S_{AVG}$. For example, if N is equal to thirty and the sampling occurs at a ten samples per second rate, the current sample distance S will equal $S_{AVG}$ only if the displacement has occurred and was maintained for a three second interval. Thus, by requiring that the current sample distance S equal the average of the previous N samples, an oscillating displacement such as that caused by a seismic event or the passing of a truck will not result in the current sample distance S being equal to $S_{AVG}$ (since the current sample distance S will be greater than or less than zero while the average displacement will be approximately equal to zero), while the movement of a vehicle in an upward direction by a tow truck or by a jack will result in equality between the current sample distance S and the average sample value $S_{AVG}$, as long as the displacement is maintained constant for the timing interval (3 seconds in the above example). As shown in step 212, if the current sample distance S is not equal to $S_{AVG}$, the system cycles back to step 207. If, however, the current sample distance S is equal to $S_{AVG}$, microprocessor 18 determines if the current sample distance S is greater than the reference distance R plus an upward threshold distance $S_{UP}$ (step 214). For example, to avoid the triggering of an alarm when a very slight displacement occurs, upward threshold distance $S_{UP}$ can be, for example, one inch, such that the displacement sensed by the system must exceed the reference distance R plus one inch before moving on to step 214. Obviously $S_{UP}$ can be any threshold value decided upon by the user.

If the $S^{UP}$ threshold level is exceeded, at step 216 microprocessor 18 calculates the velocity of the displacement and determines if it is within a velocity threshold range $V_{TR}$. The purpose of the velocity threshold range $V_{TR}$ is to assure that the displacement is not caused by an extremely slow event or an extremely fast event. For example, if the reference distance at step 202 is taken when there is a significant amount of snow on the ground, and then the snow gradually melts beyond the $S_{UP}$ threshold level, this could be interpreted as a theft event, since the distance between the sensor and the ground will appear to have increased. To avoid this situation, the velocity of the displacement must be faster than a minimum threshold speed, e.g., 1 inch per hour. Likewise, if a ball were to roll under the vehicle and stop immediately below the sensor, microprocessor 18 would read this as an apparent displacement but the displacement would be almost instantaneous, i.e., the velocity of the displacement would be extremely high. Thus, the velocity of the displacement must also be below a maximum displacement velocity to be registered as a possible theft event, e.g., 6 inches a second. The exact upper and lower threshold levels can be determined by the needs of the user and the figures given above are for the purpose of example only. The range between the maximum displacement velocity and the minimum displacement velocity is the velocity threshold range $V_{TR}$.

If at step 216, microprocessor 18 determines that the displacement identified in the previous steps is within the velocity threshold range $V_{TR}$ the alarm module 14 is triggered at step 218, causing the desired alarm event to take place, e.g., the activation of sirens, the contacting of the owner and/or police, and/or the transmitting of location data to the owner and/or the police.

If at step 214, it is determined that the current sample distance S is not greater than $S_{UP}$, at step 220 microprocessor 18 determines if the current sample distance S is less than the reference distance R minus a downward displacement distance $S_{DOWN}$. $S_{DOWN}$ represents a downward displacement that must be exceeded before the microprocessor 18 continues the steps to verify that an actual theft is occurring. Thus, for example, snowfall accumulating on the vehicle might not displace the vehicle by the value of $S_{DOWN}$, while a person entering the vehicle would displace the vehicle by the value $S_{DOWN}$. As an example, $S_{DOWN}$ could be selected to be 0.25 inches.

If microprocessor 18 determines that current sample distance S is not less than the reference value R minus $S_{DOWN}$, the system loops back to step 207. If, however, microprocessor 18 determines that the current sample S is less than the reference distance R minus $S_{DOWN}$, at step 222 the microprocessor 18 determines if field zone sensor 12 has been tripped to indicate that a person has entered the vehicle. If the field zone sensor 12 has not been tripped, the process loops back to step 207. If the field zone sensor does indicate that a person is in the vehicle, the alarm module 14 is triggered at step 218 as previously discussed.

Thus, in contrast to prior art systems which trigger an alarm simply when the distance between the sensor and the surface below changes by a minimum threshold amount, the present invention identifies the displacement profile of a displacement by, for example, measuring the rate-of-change of the displacement, i.e., the size of and the duration of the displacement, and then signals an alarm event only when there is an indication that the displacement profile conforms to a predetermined pattern or displacement profile indicating that it is a real theft event and not a naturally occurring or other non-theft event. For example, non-theft events such as a seismic tremor, snow melting under the sensor, or a person sitting on the car will produce a clearly definable displacement profile that is easily distinguishable from the displacement profile of a theft event (e.g., the lifting of the vehicle or the action of a person opening the door, sitting down in the seat, and driving the vehicle away).

By way of example, a seismic event would cause the vehicle to move up and down in a cylindrical manner, until the event ceased. The seismic event would easily displace a vehicle beyond the upper or lowering triggering set points of a conventional motion sensor, which would produce a false alarm. However, by monitoring and analyzing the rate-of-change of the displacement with respect to time (ds/dt) over time (t) the present invention detects a constantly changing slope that is cycling positive, then negative, then positive, etc., nevertheless having an average change over time of approximately zero. The displacement caused by such a cyclical rocking of the car, when compared with a predetermined "seismic event displacement profile", indicates that the displacement is attributed to a seismic event, or someone rocking the vehicle up and down, and not the actions of a thief, obviously many other displacement profiles can be identified and the microprocessor 18 programmed to recognize them.

In an actual theft event during which, for example, the vehicle is lifted from a roadway or tarmac to a significant height and in a relatively short period of time, the rate-of-change of the displacement over time would significantly differ from that of the above-mentioned seismic event. In contrast to the previous example, this example of an actual theft event results in a displacement with a constantly varying slope, ds/dt, over time, t, resulting in a superimposed slope (trend line) that has an average value that remains positive, i.e., not equal to zero. Thus, in an alternative embodiment, steps 212 and 214 of FIG. 3 can be skipped so that, if desired, the system can activate the alarm module 14 if a velocity of displacement is positive and within the velocity threshold range $V_{TR}$, i.e., go from step 210 directly to step 216. Since the displacement profile of this theft event indicates a constant, positive displacement over time, the alarm, notification and/or tracking systems are activated.

As noted above, the system, has the capability to automatically locate the vehicle, and provide other vehicle particulars, e.g. color, owner, nature of the exigency, etc. utilizing conventional wireless communication methods These vehicle particulars can be coded/recorded in advance so that they are communicated automatically when an event occurs, either as data or as a voice message.

The voice message can be recorded by the user or generated via voice synthesizer or other known voice processing means included in voice processor 16. By way of example, voice processor 16 can comprise an ISD 2560 voice recording chip. A second message containing the location of the vehicle and can be transmitted either digitally or by means of an audio recording. The digital message is generated by integrating a conventional GPS system to determine and communicate the vehicles location electronically in standard GPS format. For example, if the microprocessor 18 is connected to a cellular system and a GPS system, location information can be sent either by voice transmission or digitally using Dual Tone Modulated Frequency (DTMF) in a well-known manner.

Pinpointing the exact location of a vehicle when it is parked hinges on the GPS or other location system having an unobstructed line-of-sight with the appropriate orbital satellites. This line-of-site requirement cannot always be satisfied, e.g., when a light is parked in an enclosed garage, or, between very tall buildings. When such a line-of-sight problem occurs, this fact is automatically conveyed to the vehicle operator by the appearance of a light, or other form of indication in the cab of the vehicle. This can be accomplished by having microprocessor 18 activate the indicator in the vehicle cab when the GPS system indicator it is out of range of the appropriate satellite(s) or is otherwise nonfunctional. The operator can then record an audio message using standard recording/playback capability of voice processor 16 indicating the vehicles parked location for subsequent automatic transmission when the alarm module 14 is activated.

For example, if the owner receives an indication that the GPS system is nonfunctional, the owner records a message via voice processor 16 indicating the location of the vehicle, and inputs a phone number where he/she can be called. When the alarm module 14 is activated by a would-be-thief, the police (or authorized security agent) and/or the vehicle owner are dialed and the pre-recorded message indicating that the vehicle is being stolen, the particulars of the vehicle, and including the owner's message indicating the vehicle's location is played.

Several exemplary scenarios under which alarm system of the present invention will or will not be triggered as set forth below.

Scenario 1—A thief enters the vehicle through a window that was left open (glass is not shattered and thus the audio sensor, if present, is not triggered), or enters a convertible with the top down without opening the door. The field zone sensor is triggered. The downward displacement of the vehicle is sensed by ultrasonic system 100 and microprocessor 18 determines, carrying out the steps in FIG. 3, that the displacement profile compared with the predetermined theft profile indicates an actual theft event occurring. This activates alarm module 16, which indicates the alarm condition in the desired manner (siren, notify police/owner, etc.). The displacement profile of the present alarm system requires that the ultrasonic sensor system 100 detect a downward displacement occurring at a specific velocity, for a specific duration, thereby confirming the ongoing theft, before the alarm system fully activated.

Scenario 2—A person sits on the vehicle, but not in the cab, then after a brief period of time leaves without further activity. The vehicle is displaced in the downward direction, as in Scenario 1, but this time, since there has been no entry into the vehicle, field zone sensor 12 is not triggered. In this scenario the alarm system is not activated because the displacement profile indicates a non-theft event.

Scenario 3—A thief does not attempt to enter the vehicle, but instead uses a state-of-the-art tow truck and, without getting out of the cab of the two truck, backs-up to the front or rear of the vehicle and then lifts it up, very gently to avoid a sudden jolt or shock. The displacement profile of this action, when compared with the displacement profile of an actual theft, indicates that the vehicle has moved upward at a velocity that is within $V_{TR}$, and that the displacement is a sustained displacement. This causes alarm module 14 to be triggered.

Scenario 4—An earthquake occurs while the warning system is armed. In this scenario the vehicle is thrust violently downward and then upward or visa versa. Both $S_{UP}$ and $S_{DOWN}$ are exceeded, but the alarm module 14 is not activated because the displacement profile, when compared to displacement profile of a seismic event, indicates the displacement is not sustained but is instead cyclical in nature. This displacement profile indicates a non-theft event.

While there has been described herein the principles of the invention, it is to be understood by those skilled in the art that this description is made only by way of example and not as a limitation to the scope of the invention. For example, the minimum and maximum threshold levels set forth herein can be increased or decreased dependent on the desires of the user. The displacement duration can be made shorter if it is desired to have a faster acting alarm, or can be made longer if it is desired to have an alarm that requires more sampling before determining if a displacement profile has been met. Accordingly, it is intended by the appending claims, to cover all modifications of the invention which fall within the true spirit and scope of the invention.

I claim:

1. An alarm system for a motor vehicle, comprising:

a) a displacement sensor that measures the distance between said displacement sensor and a surface on which the motor vehicle sits;

b) an indication system; and c) logic means connected to said displacement sensor and to said indication system, said logic means including instruction means for activating said indication system when said displacement sensor senses a displacement event that matches a predetermined displacement profile.

2. An alarm system according to claim 1, wherein said displacement profile includes the rate-of-change of the sensed displacement cover.

3. An alarm system according to claim 1, wherein said displacement profile includes the duration of the sensed displacement event.

4. An alarm system according to claim 1, wherein said displacement profile includes the rate-of-change and duration of the displacement.

5. An alarm system according to claim 1 wherein said logic means comprises a microprocessor.

6. An alarm system according to claim 5 wherein said instructions means comprises a computer program.

7. An alarm system according to claim 1 wherein said logic means calculates said displacement profile based on the rate-of-change and the direction of the displacement event.

8. An alarm system according to claim 7, wherein said displacement event is measured relative to the displacement sensor and the surface on which the vehicle rests.

9. An alarm system as set forth in claim 1, wherein said displacement sensor is an ultrasonic sensing device.

10. An alarm system according to claim 1, wherein said indicating system comprises a global positioning system (GPS) operatively coupled to a cellular telephone system, wherein said GPS includes means for determining if said GPS is able to determine and transmit information regarding the location of the vehicle, and wherein said alarm system further comprises:

a GPS signal indicator, said GPS signal indicator providing an indication, to a user of said motor vehicle, that said GPS is unable to determine and transmit information regarding the location of said vehicle.

11. An alarm system according to claim 10, wherein said motor vehicle includes a cab in which a user of said motor vehicle is located during operation of said motor vehicle, and wherein said GPS signal indicator is located within said cab.

12. An alarm system according to claim 1, wherein said indicating system comprises a wireless telecommunication system (WTCS) operatively coupled to a cellular telephone system, wherein said WTCS includes means for determining if said WTCS is able to determine and transmit information regarding the location of the vehicle, and wherein said alarm system further comprises:

a WTCS signal indicator, said WTCS signal indicator providing an indication, to a user of said motor vehicle, that said WTCS is unable to determine and transmit information regarding the location of said vehicle.

13. An alarm system according to claim 12, wherein said motor vehicle includes a cab in which a user of said motor vehicle is located during operation of said motor vehicle, and wherein said WTCS signal indicator is located within said cab.

14. A method of determining the nature of a displacement of a vehicle with respect to a surface, comprising the steps of:

measuring and storing a reference distance between the vehicle and the surface;

continuously monitoring the distance between the vehicle and the surface;

calculating a displacement profile of a displacement event when it occurs;

comparing the calculated displacement profile with predetermined displacement profiles; and producing a signal indicative of the nature of the displacement event.

15. The method of claim 14, wherein said calculation step includes calculating the rate-of-change of said displacement event.

16. The method of claim 14, wherein said calculation step includes calculating the duration of said displacement event.

*17. An alarm system for a motor vehicle or aircraft, comprising:*

*a) a displacement sensor for measuring linear displacement of a vehicle or aircraft relative to a plurality of predetermined displacement profiles that include theft and non-theft profiles;*

*b) an indication system; and*

*c) logic means connected to said displacement sensor and to said indication system, said logic means including instruction means for activating said indication system when said displacement sensor senses a displacement event that matches a predetermined displacement profile.*

*18. An alarm system according to claim 17, wherein said displacement profile includes the rate-of-change of the sensed displacement event.*

*19. An alarm system according to claim 17, wherein said displacement profile includes the duration of the sensed displacement event.*

*20. An alarm system according to claim 17, wherein said displacement profile includes the rate-of-change and duration of the displacement.*

*21. An alarm system according to claim 17, wherein said logic means comprises a microprocessor.*

*22. An alarm system according to claim 21, wherein said instruction means comprises a computer program.*

*23. An alarm system according to claim 17, wherein said logic means calculates said displacement profile based on the rate-of-change and the direction of the displacement event.*

*24. An alarm system according to claim 23, wherein said displacement event is measured relative to the displacement sensor and any two points.*

*25. An alarm system according to claim 17, wherein said displacement sensor is an ultrasonic sensing device or an accelerometer, or a sensor system for measuring a distance between two points.*

*26. A method of determining the distance of a displacement vehicle or aircraft, comprising the steps of:*

*a) measuring and storing a point of reference;*

*b) continuously monitoring the reference point of a vehicle or aircraft and any displacement;*

*c) calculating a displacement profile of a displacement event when it occurs;*

*d) comparing the calculated displacement profile with predetermined displacement profiles; and*

*e) producing a signal indicative of the nature of the displacement event.*

*27. The method of claim 26, wherein said calculation step includes calculating the rate-of-change of said displacement event.*

*28. The method of claim 26, wherein said calculation step includes calculating the duration of said displacement event.*

* * * * *